(12) United States Patent
Ajisawa

(10) Patent No.: US 6,953,931 B2
(45) Date of Patent: Oct. 11, 2005

(54) BOLOMETER TYPE INFRARED DETECTOR

(75) Inventor: Akira Ajisawa, Tokyo (JP)

(73) Assignee: NEC Corporation, Tokyo (JP)

( * ) Notice: Subject to any disclaimer, the term of this patent is extended or adjusted under 35 U.S.C. 154(b) by 103 days.

(21) Appl. No.: 10/271,720

(22) Filed: Oct. 17, 2002

(65) Prior Publication Data

US 2003/0071215 A1 Apr. 17, 2003

(30) Foreign Application Priority Data

Oct. 17, 2001 (JP) ........................................ 2001-319125

(51) Int. Cl.[7] ................................................ G01J 5/12
(52) U.S. Cl. .................... 250/338.1; 250/336.1
(58) Field of Search ......................... 250/338.1, 336.1, 250/339.14

(56) References Cited

U.S. PATENT DOCUMENTS

| | | | | |
|---|---|---|---|---|
| 4,349,808 A | * | 9/1982 | Kraus ........................... | 338/18 |
| 5,107,117 A | * | 4/1992 | Ennenga et al. ............. | 250/334 |
| 5,479,018 A | * | 12/1995 | McKee et al. ........... | 250/338.1 |
| 6,690,014 B1 | * | 2/2004 | Gooch et al. ............ | 250/338.4 |
| 2001/0050221 A1 | * | 12/2001 | Higuma et al. ........ | 204/192.21 |
| 2003/0052271 A1 | * | 3/2003 | Fedder et al. ............ | 250/338.4 |

FOREIGN PATENT DOCUMENTS

| | | |
|---|---|---|
| JP | 4-92656 | 8/1992 |
| JP | 10-274561 | 10/1998 |
| JP | A 2000-65637 | 3/2000 |
| JP | A 2000-346704 | 12/2000 |

OTHER PUBLICATIONS

C. Marshall et al., "Uncooled Infrared Sensor With Digital Focal Plane Array", SPIE 1996, vol. 2746, pp. 23–31.
B.R. Johnson et al., "Silicon Microstructure Superconducting Microbolometer Infrared Arrays", SPIE, vol. 2020, pp. 2–10.

* cited by examiner

Primary Examiner—David Porta
Assistant Examiner—Christine Sung
(74) Attorney, Agent, or Firm—Young & Thompson

(57) ABSTRACT

A bolometer type infrared detector can restrict temperature drift due to self-heating and has a structure not causing degradation of characteristics by noise. The bolometer type infrared detector has a bolometer thin film serving as infrared ray detecting element, the bolometer thin film being divided into a plurality of rectangular elements, the element being connected in series.

8 Claims, 4 Drawing Sheets

BOLOMETER TYPE INFRARED DETECTOR

BACKGROUND OF THE INVENTION

1. Field of the Invention

The present invention relates generally to a bolometer type infrared detector having a thermal-separation structure. More particularly, the invention relates to a bolometer type infrared detector with high performance which can restrict temperature drift and noise.

2. Description of the Related Art

An infrared detector is generally classified into a quantum type infrared detector utilizing band structure of semiconductor or the like and a thermal type infrared detector utilizing variation of physical property value (resistance, dielectric constant and so forth) depending upon heat. The former has high sensitivity but requires cooling in the light of operation principle. In contrast to this, the latter is called as uncooled type because it does not require cooling. Therefore, it is advantageous in view point of production cost, maintenance cost and in comparison with the quantum type one. As the result, the thermal type infrared detector is becoming main stream of the infrared detector.

A thermal type infrared detector includes bolometer type, pyroelectric type and thermocouple type infrared detectors. In order to enhance sensitivity of the infrared detectors of any type, a thermal isolation structure, namely a diaphragm structure, is employed. Amongst, the bolometer type infrared detector has relatively superior characteristics. Particularly, the infrared detector, in which vanadium oxide ($VO_2$) is used as bolometer material, as set forth in SPIE (1996, Vol. 2746, pp.23–31), the bolometers are arranged two-dimensionally as infrared imaging elements. Here, with taking one pixel for example, typical structure of the bolometer type infrared detector will be discussed. FIG. 3 is a plan view showing a structure of the conventional bolometer type infrared detector, and FIG. 4 is a section taken along line B-B' in FIG. 3.

As shown in FIGS. 3 and 4, the bolometer type infrared detector is generally constituted of a thermoelectric converting portion 1 and a beam 2 supporting the same. The thermoelectric converting portion 1 is a diaphragm structure supported by the beam 2. The diaphragm structure is constituted of a supporting film 3, a bolometer thin film 4 as thermoelectric material, an electrode 6 for detecting variation of resistance of the bolometer thin film 4 and a protection film 5. These components are thermally separated from a substrate 9 by means of a air gap 8.

The diaphragm structure is formed by depositing a sacrificing layer on the substrate 9, depositing the support film 3 and the bolometer thin film 4, performing patterning the bolometer thin film 4, forming the electrode 6, depositing the protection film 5, performing patterning, such as by dry etching or the like for shaping respective layers into desired shapes and exposing the sacrificing layer around the thermoelectric converting portion 1, and finally removing the sacrificing layer from the portion around the thermoelectric converting portion 1 by etching. The air gap 8 as a portion where the sacrificing layer is removed, is a completely hollow space. The thermoelectric converting portion 1 is suspended by the beam 2. While not particularly illustrated, the tip end of the beam 2 is grounded to the substrate 9. Opposite two edges of the bolometer thin film 4 are contacted with the electrodes 6. These electrodes 6 are connected to a signal processing circuit via the beam 2. A temperature of diaphragm is elevated by absorbing infrared rays to cause variation of resistance of the bolometer thin film 4 to take out as an electric signal.

On the other hand, when the bolometer materials having low specific resistance, such as titanium (Ti), yittrium-barium copper oxide (BCO) and so forth are employed, while it is advantageous for capability of integration of the electrode and the bolometer material, it becomes necessary to employ a meander structure on the diaphragm shown in FIG. 5 in order to control a resistance value as element to a desired value. This example has been discussed in SPIE (1993, volume 2020, pp.2–10). The meander structure has narrow width and large number of times of turning back, but is not considered to be electrically influenced by the shape for using low resistance material (for example, non-uniformity of current density at turning back positions and so forth).

The bolometer type infrared detector elevates the temperature of diaphragm by absorbing infrared rays to read out resistance variation of the bolometer caused by temperature elevation of the diaphragm as an electric signal. In practice, upon operation, a current flows through the bolometer by applying bias to cause diaphragm temperature elevation by self-heating by Joule heat. Temperature elevation by Joule heat can be a cause of temperature drift upon operation and significantly influence for the electric signal depending upon variation of resistance of the bolometer. Therefore, Joule heat dependent temperature elevation should be restricted as much as possible. Therefore, a bolometer resistance is preferred to be as high as possible, and is appropriate to be about 100 k$\Omega$.

$VO_2$ as a material obtained relatively high value of resistance temperature coefficient (TCR) in the extent of –2%/K, has a sheet resistance of 10 to 20 k$\Omega$ at a thickness of about 1000 Å (100 nm). In order to obtain 100 k$\Omega$ as bolometer resistance for reducing influence of temperature drift, it is considered to improve bolometer shape and reducing thickness or thinning in the extent of 1/5 to 1/10 from the current thickness or wire diameter. By this, temperature drift can be improved.

On the other hand, it has been known that as the noise of the bolometer type infrared detector, 1/f noise is dominant. An amount Sv of 1/f noise is expressed by the following equation:

$$Sv = \frac{KV^2}{f} \tag{1}$$

wherein V is a voltage, a value K as coefficient of 1/f noise is said to depend upon volume of the bolometer material or number of carriers. Namely, greater volume or smaller specific resistance (greater number of carriers), the value K becomes smaller to achieve superior performance. However, even if the resistance is increased and temperature drift is improved for the method set forth above, noise characteristics is significantly degraded by volume effect. Finally, superior performance cannot be obtained. On the other hand, even by improving the material per se, and increasing specific resistance, degradation of noise characteristics cannot be avoided due to effect of number of carriers.

Accordingly, it has been desired to increase only resistance of the bolometer with maintaining volume thereof substantailly unchanged. As a method for realizing this, meander structure as shown in FIG. 5 is considered in the prior art. In FIG. 6, there is shown a condition where wiring is formed by electrodes 6 with forming the bolometer thin film 4 into meander structure using normal $VO_2$. Since specific resistance is high in comparison with FIG. 5, width of the meander structure is wider and number of turning backs is smaller.

In this structure, volume of the entire bolometer is held substantially unchanged as compared with FIG. 3 and only resistance is adjusted to be in the extent of 100 kΩ. In the turning back (bent) portion, a current density becomes particularly non-uniform to reduce effective volume contributing for operation. Accordingly, concerning the value K, with respect to the value premised from the volume of the bolometer, twice or three times of fatigue is caused. On the other hand, the current concentrates to the inner portion of the curved portion to be high temperature to cause adverse effect to the operation.

SUMMARY OF THE INVENTION

The present invention has been worked out in view of the problems set forth above. It is therefore an object of the present invention to provide a bolometer type infrared detector which can restrict temperature drift due to self-heating and has a structure not causing degradation of characteristics by noise.

According to the first aspect of the present invention, a bolometer type infrared detector comprises:

a bolometer thin film serving as infrared ray detecting element, the bolometer thin film being divided into a plurality of rectaqular elements, the elements being connected in series.

According to the second aspect of the present invention, a bolometer type infrared detector comprises:

a thermoelectric converting portion consisted of a supporting film, a bolometer thin film provided on the support film and a protection layer provided on the bolometer thin film, the thermoelectric converting portion being supported on a beam for forming a diaphragm structure, the bolometer thin film being divided into a plurality of rectangular elements, and the plurality of rectangular elements being connected in series.

Preferably, number of the elements is determined with reference to an allowable value of a Joule heat to be generated by the bolometer thin film.

The bolometer thin film may be consisted of a plurality of elements having mutually different widths.

The bolometer thin film may be arranged in a two-dimensional matrix on a signal read out circuit wafer.

Namely, in the present invention, the bolometer thin film is processed into a plurality of rectangular elements to arrange in the array as shown in FIG. 1. The rectangular elements are connected in series by the electrodes. Accordingly, higher bolometer resistance can be achieved with coventional deposition condition and thickness of the bolometer thin film to be identical to the prior art. Thus, temperature elevation by Joule heat upon operation can be restricted, and influence for temperature drift can be restricted. Furthermore, in the structure of the present invention, the volume of the bolometer is substantially comparable with the conventional structure even in consideration of effective volume to flow the current contributing for operation. Therefore, even though the bolometer resistor is increased, the value K is not increased to suppress 1/f noise satisfactorily.

By employing the foregoing structure, the bolometer resistor becomes higher for one digit without causing degradation of noise characteristics. Therefore, it becomes possible to provide the bolometer type infrared detector suppressing temperature drift.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of a bolometer type infrared detector in accordance with the present invention with reference to the accompanying drawings. In the following description, numerous specific details are set forth in order to provide a thorough understanding of the present invention.

Figure 1:
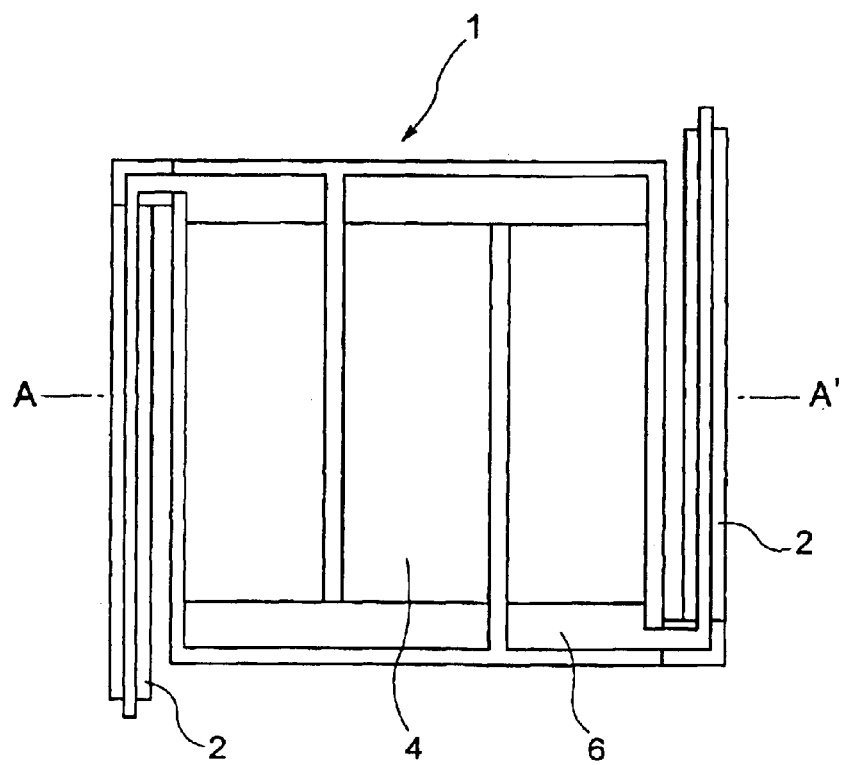
FIG. 1 is a plan view showing a structure of one pixel of the preferred embodiment of a bolometer type infrared detector according to the present invention.
Figure 2:
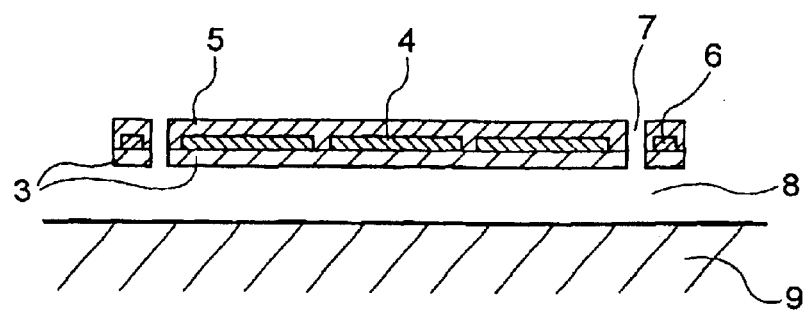
FIG. 2 is a section of the preferred embodiment of the bolometer type infrared detector according to the present invention as taken along line A—A of FIG. 1.
Figure 3:
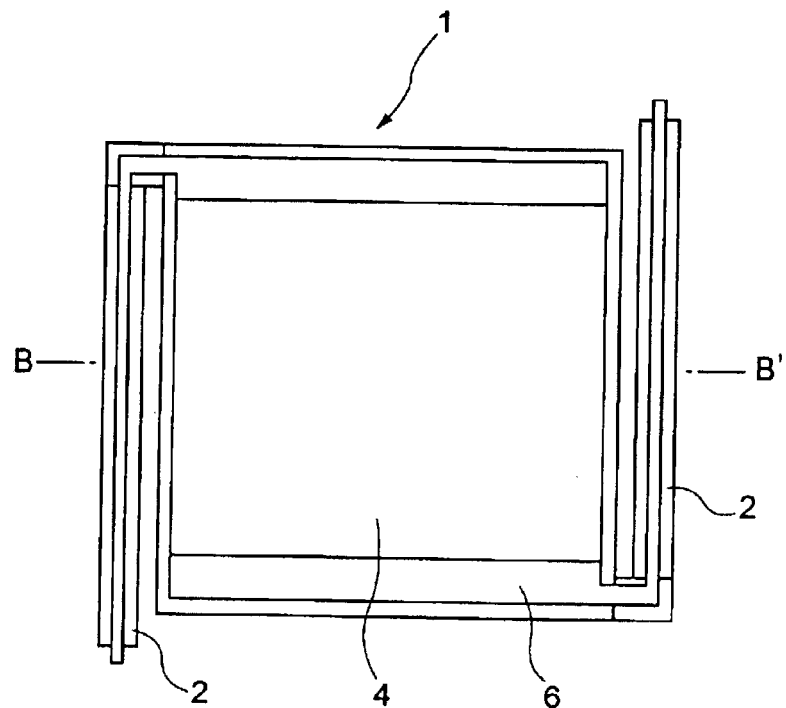
FIG. 3 is a plan view of one pixel of the conventional bolometer type infrared detector.
Figure 4:
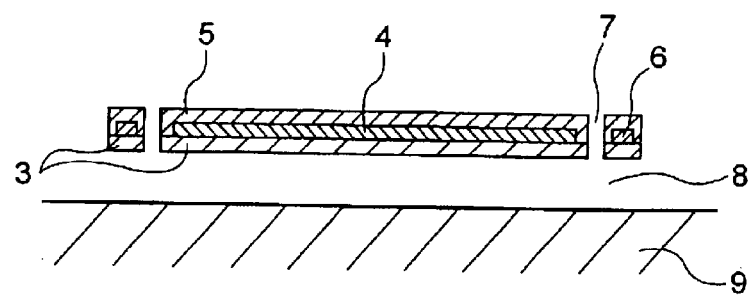
FIG. 4 is a section of the conventional bolometer type infrared detector as taken along line B-B' of FIG. 3.
Figure 5:
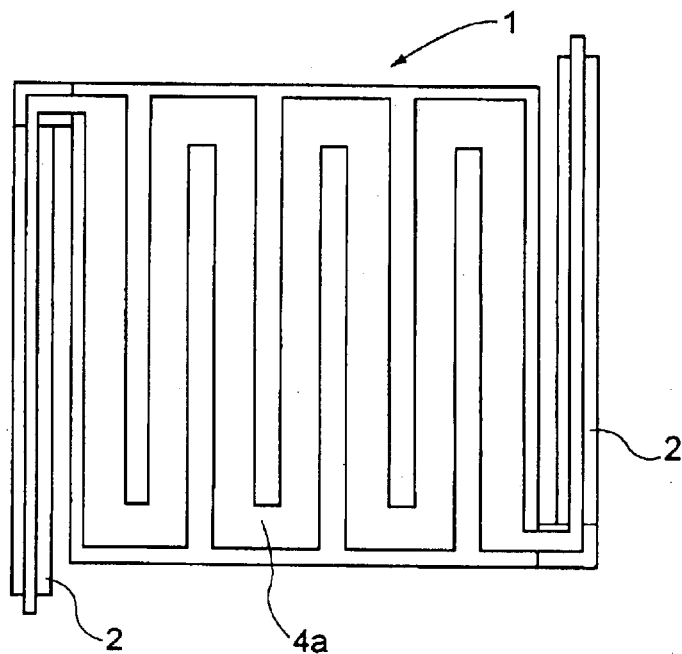
FIG. 5 is a plan view of the conventional bolometer type infrared detector of meander structure using low resistance bolometer material.
Figure 6:
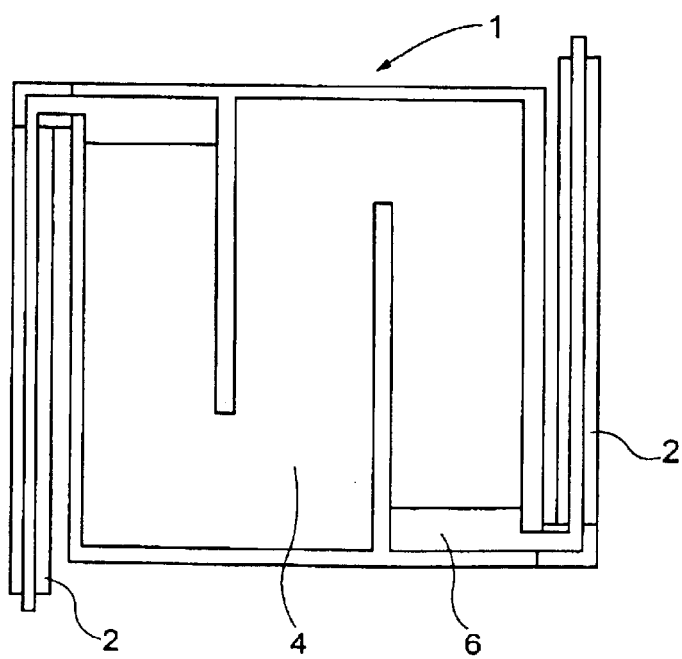
FIG. 6 is a plan view of the conventional bolometer type infrared detector of meander structure using $VO_2$.

Construction, manufacturing process, operation and characteristics of the preferred embodiment of a bolometer type infrared detector according to the present invention will be discussed hereinafter with reference to FIGS. 1 and 2. FIG. 1 is a plan view showing a construction of the preferred embodiment of the bolometer infrared detector according to the present invention, and FIG. 2 is a section taken along line A-A' of FIG. 1. It should be noted that, in the shown embodiment, discussion will be given form the case where $VO_2$ is used as material of bolometer.

As shown in FIG. 1, the shown embodiment of the bolometer type infrared detector has a construction, in which a diaphragm serving as a thermoelectric converting portion 1 is supported by two beams 2. While not particularly illustrated in the drawing, tip ends of the beams 2 are secured on a substrate 9. A bolometer thin film 4 is constructed with three rectangular elements in the diaphragm. These three rectangular elements are electrically connected in series by electrodes 6. Variation of resistance due to heat of the bolometer thin film 4 can be taken out via the electrodes 6 in the beams 2. On the other hand, as shown in FIG. 2, the thermoelectric converting portion 1 and the beams 2 are held in floating condition over a hollow space by a air gap and thus is thermally isolated from the substrate.

In the shown embodiment, a size of the thermoelectric converting portion 1 is 30 $\mu m^2$, a width of each rectangular bolometer thin film 4 is 9 $\mu m$, an interval between adjacent rectangular bolometer thin films 4 is 0.5 $\mu m$, a width of the beam 2 is 2 μm, a width of the electrode 6 in the beam 2 is 1 μm. On the other hand, a width of a through hole (slit width) 7 between the thermoelectric converting portion 1 and the beam 2 is 1 μm.

Next, discussion will be given for a manufacturing method of the shown embodiment of the bolometer type infrared detector. At first, on the substrate 9, polyimide is applied in a thickness of 2 to 3 μm as sacrificing layer (not particularly illustrated). After process relating to electrical patterning, annealing is performed. Thereafter, the support film 3 is deposited in a extent of 300 nm and the bolometer thin film 4 is deposited in the extent of 100 nm. Then, only bolometer thin film 4 is processed into three rectangular elements by dry etching. Size of each rectangular element of the bolometer thin film 4 is 9 μm in width and 28 μm in length. An interval between adjacent two rectangular elements is 0.5 μm. Thereafter, the electrode 6 is processed to electrically connecting the rectangular elements of the bolometer 4 in series and in a manner to lead out variation of the resistance via the beams 2. Subsequently, the protection layer 5 is deposited over the entire surface in a thickness of 300 nm. Here, as the support film 3 and the protection film 5, silicon nitride film is used and the electrodes 6 are formed of titanium. Next, leaving the thermoelectric converting portion 1 and the beams 2, the protection film 5 and the support film 3 around the thermoelectric converting portion 1 and the beams 2 is removed by dry etching until the sacrificing layer is reached to form a through hole (slit) 7. Finally, polyimide forming the sacrificing layer is removed by acing through the through hole 7 to form the air gap 8 to complete the bolometer type infrared detector.

Operation and characteristics of the bolometer type infrared detector formed through the process set forth above will be discussed briefly. When infrared rays are input on the upper surface of the diaphragm structure, the infrared rays are absorbed by the support film 3 and the protection film 5 to elevate temperature of the thermoelectric converting portion 1 to cause variation of the resistance of the bolometer thin film 4. Here, as the bolometer thin film 4, $VO_2$ having general sheet resistance 12 kΩ and resistance temperature coefficient of –2%/K is used. Resistance varied by temperature elevation is lead out through the electrodes 6 to detect amount of incident infrared rays. In practice, in order to read out resistance variation, a bias voltage is applied to both ends of the electrodes 6 to read variation from a current amount flowing therethrough.

At this time, self-heating is caused by Joule heat ($W=V^2/R$) due to application of the bias voltage. In general, when self-heating amount is large, temperature of the diaphragm fluctuate in expiration of time to be a cause of temperature drift to influence for temperature elevation by incident infrared rays. However, in case of the structure of the shown embodiment, $VO_2$ having sheet resistance of 12 kΩ is used for forming three rectangular elements of the bolometer thin film 4 arranged in parallel, which three rectangular elements are in turn connected in series by the electrodes 6 to establish bolometer resistance of 108 kΩ. Accordingly, self-heating by Joule heat can be lowered for one digit in comparison with the prior art to permit stable operation.

On the other hand, sensitivity of the bolometer type infrared detector is mainly determined by the resistance temperature coefficient of the bolometer thin film 4 and a thermal conductance of the beam 2. However, in consideration of performance of the entire element, noise is also important factor. As set forth above, among the noises of the bolometer type infrared detector, 1/f noise is dominant. Thus, smaller value K which is proportional to a volume of bolometer material and a reciprocal of carrier number, is higher in performance. In the structure of the shown embodiment, by forming the bolometer thin film with three rectangular elements, higher resistance of the entire bolometer as high as 108 kΩ is achieved with the bolometer thin film having comparable specific resistance and comparable film thickness, and in conjunction therewith, volume comparable with the prior art can be obtained. Furthermore, even in connection with the value K, comparable low value with the conventional value, as low as $3\times10^{-13}$. Thus, high resistance can be attained without increasing noise.

By arranging the bolometer type infrared detector of the foregoing construction in two-dimensionally on a signal read out circuit wafer, two-dimensional array sensor can be realized relatively easily.

It should be noted that, in the shown embodiment, the bolometer thin film 4 has a structure constituted with three parallel rectangular elements. However, the present invention is not limited to the shown construction and number of the rectangular elements and width thereof may be arbitrarily modified depending upon performance required for the bolometer type infrared detector. For example, while the shown embodiment has been discussed in terms of the bolometer resistance of 100 kΩ, it is also possible to obtain further higher bolometer resistance with maintaining the noise low level by using film having relatively small value K and having sheet resistance of 10 to 20 kΩ and by adjusting number and width of the rectangular elements.

On the other hand, number of the rectangular elements can be determined with reference to allowable value of the Joule heat generated by the bolometer thin film. Joule heat W is generally expressed using the voltage V and the resistance R by $W=V^2/R$. Assuming the sheet resistance used in normal structure as $R_0$, number of the rectangular elements as n, the resistance is expressed by $R=n^2 \cdot R_0$. Accordingly, $$W=V^2/(n^2 \cdot R_0)$$

and, n is expressed by:

$$n=\{V^2/(n^2 \cdot R_0)\}^{1/2}$$

Now, similarly to the conventional structure, assuming V=4V, $R_0$=12 kΩ, W=1.33 mW, and assuming allowable value of the Joule head W is 0.2 mW (W≦0.2 mW), from the foregoing equation for n, n≧2.58. Since n is integer, n=3 is obtained.

Figure 7:
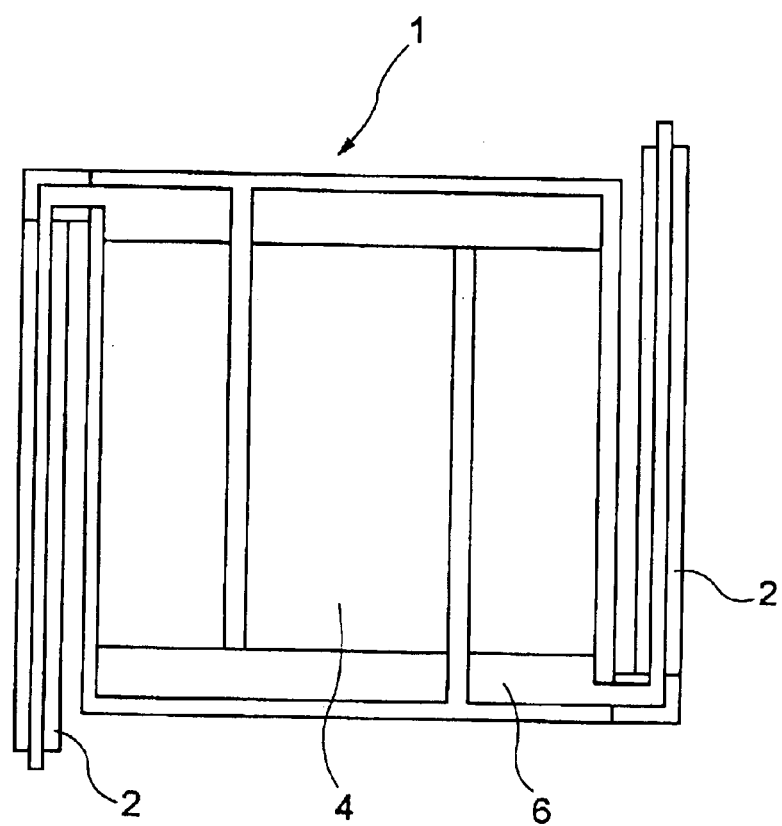
FIG. 7 is a plan view showing another embodiment of the bolometer type infrared detector according to the present invention.

On the other hand, the shown embodiment illustrated in FIG. 1 has the rectangular elements of the bolometer thin film 4 of substantially the same shape, respective elements of the bolometer thin film 4 may be differentiated in the shape. For example, as shown in FIG. 7, the center element may be formed to have a width wider than that of the elements at both sides. By differentiating width in the elements of the bolometer thin film, series resistance can be adjusted without varying the volume.

Also, in the shown embodiment, while the example is shown in that the silicon nitride layer is used for the support film 3 and the protection film 5, and vanadium oxide is used for the bolometer thin film 4, the materials forming respective films should not be limited to those in the shown embodiment. For example, silicon oxide film may be used for the support film 3 and the protection film, and amorphous silicon or the like may be used for the bolometer thin film 4. The effect of the present invention can be obtained even with the modified materials set forth above.

It should be noted that the bolometer type infrared detector may be formed as a two-dimensional array on a signal read out circuit wafer.

As set forth above, with the structure according to the present invention, since the bolometer thin film is divided into a plurality of rectangular elements which are connected in series by a low resistance electrode, it becomes possible to obtain high bolometer resistance with maintaining noise low level. Thus, in comparison with the low resistance bolometer, degradation of characteristics due to self-heating or the like can be restricted to obtain high performance bolometer type infrared detector.

On the other hand, in the structure of the present invention, since each bolometer is formed into linear shape having no curved portion, adverse effect due to current concentration can be restricted in comparison with the convention meandering structure, in which the bolometer thin film is curved for achieving high performance.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A bolometer type infrared detector comprising:
    a bolometer thin film serving as infrared ray detecting element, said bolometer thin film being divided into a plurality of rectangular elements, said elements being connected in series.

2. A bolometer type infrared detector as set forth in claim 1, wherein number of said elements is determined with reference to an allowable value of a Joule heat to be generated by said bolometer thin film.

3. A bolometer type infrared detector as set forth in claim 1, wherein said bolometer thin film is consisted of a plurality of said elements having mutually different widths.

4. A bolometer type infrared detector as set forth in claim 1, wherein said bolometer thin film is arranged in a two-dimensional matrix on a signal read out circuit wafer.

5. A bolometer type infrared detector comprising:
    a thermoelectric converting portion consisted of a supporting film, a bolometer thin film provided on said support film and a protection layer provided on said bolometer thin film, said thermoelectric converting portion being supported on a beam for forming a diaphragm structure,
    said bolometer thin film being divided into a plurality of rectangular elements, and said plurality of rectangular elements being connected in series.

6. A bolometer type infrared detector as set forth in claim 5, wherein number of said elements is determined with reference to an allowable value of a Joule heat to be generated by said bolometer thin film.

7. A bolometer type infrared detector as set forth in claim 5, wherein said bolometer thin film is consisted of a plurality of said elements having mutually different widths.

8. A bolometer type infrared detector as set forth in claim 5, wherein said bolometer thin film is arranged in a two-dimensional matrix on a signal read out circuit wafer.

* * * * *